(12) United States Patent
Shen et al.

(10) Patent No.: US 10,868,767 B2
(45) Date of Patent: Dec. 15, 2020

(54) DATA TRANSMISSION METHOD AND APPARATUS IN OPTOELECTRONIC HYBRID NETWORK

(71) Applicant: Huawei Technologies Co., Ltd., Shenzhen, Guangdong (CN)

(72) Inventors: Weifeng Shen, Hangzhou (CN); Xiuchu Zhao, Shenzhen (CN); Fengwei Zhang, Hangzhou (CN)

(73) Assignee: HUAWEI TECHNOLOGIES CO., LTD., Guangdong (CN)

( * ) Notice: Subject to any disclaimer, the term of this patent is extended or adjusted under 35 U.S.C. 154(b) by 151 days.

(21) Appl. No.: 15/821,620

(22) Filed: Nov. 22, 2017

(65) Prior Publication Data
US 2018/0102978 A1 Apr. 12, 2018

Related U.S. Application Data

(63) Continuation of application No. PCT/CN2015/079829, filed on May 26, 2015.

(51) Int. Cl.
| | |
|---|---|
| *H04L 12/805* | (2013.01) |
| *H04L 12/46* | (2006.01) |
| *H04L 29/06* | (2006.01) |
| *H04L 29/08* | (2006.01) |
| *H04Q 11/00* | (2006.01) |
| *H04L 12/26* | (2006.01) |
| *H04L 12/931* | (2013.01) |

(52) U.S. Cl.
CPC .......... *H04L 47/36* (2013.01); *H04L 12/4633* (2013.01); *H04L 12/4641* (2013.01);
(Continued)

(58) Field of Classification Search
CPC . H04L 47/36; H04L 12/4633; H04L 12/4641; H04L 67/1097; H04L 69/14;
(Continued)

(56) References Cited

U.S. PATENT DOCUMENTS

| | | | |
|---|---|---|---|
| 9,313,147 B1 * | 4/2016 | Kabbani | ................. H04L 49/15 |
| 2014/0019574 A1 | 1/2014 | Cardona et al. | |

(Continued)

FOREIGN PATENT DOCUMENTS

| | | |
|---|---|---|
| CN | 103636181 A | 3/2014 |
| CN | 103685033 A | 3/2014 |

(Continued)

OTHER PUBLICATIONS

Farrington et al, "Helios: A Hybrid Electrical/Optical Switch Architecture for Modular Data Centers," Sep. 3, 2010, ACM, pp. 1-12. (Year: 2010).*

(Continued)

*Primary Examiner* — Azizul Choudhury
(74) *Attorney, Agent, or Firm* — Womble Bond Dickinson (US) LLP

(57) ABSTRACT

The present disclosure relates to a data transmission method and apparatus in an optoelectronic hybrid network. The method is: receiving an RDMA transmission request, and determining an RDMA transmission type and a to-be-transmitted data volume for data transmission according to the RDMA transmission request; determining a preset encapsulation format corresponding to the RDMA transmission type for data transmission and the to-be-transmitted data volume for data transmission; receiving to-be-transmitted data and encapsulating the to-be-transmitted data into a to-be-transmitted data packet of the determined preset encapsulation format; selecting a switching link for data transmission from an optical switching link and an electrical switching link (Continued)

according to a size of the to-be-transmitted data packet; and sending the to-be-transmitted data packet to a peer end based on the selected switching link for data transmission. Therefore, a proper switching link can be selected each time RDMA transmission for data transmission is performed.

18 Claims, 9 Drawing Sheets

(52) U.S. Cl.
CPC .......... *H04L 67/1097* (2013.01); *H04L 69/14* (2013.01); *H04Q 11/0003* (2013.01); *H04Q 11/0066* (2013.01); *H04L 43/16* (2013.01); *H04L 49/60* (2013.01); *H04L 69/321* (2013.01); *H04L 2212/00* (2013.01); *H04Q 2011/0073* (2013.01)

(58) Field of Classification Search
CPC ....... H04L 43/16; H04L 49/60; H04L 69/321; H04L 2212/00; H04Q 2011/0073; H04Q 11/0066
See application file for complete search history.

(56) References Cited

U.S. PATENT DOCUMENTS

| | | | |
|---|---|---|---|
| 2016/0226951 A1* | 8/2016 | Talpey | H04L 47/39 |
| 2017/0168970 A1* | 6/2017 | Sajeepa | G06F 13/385 |
| 2017/0302565 A1* | 10/2017 | Ghobadi | H04L 45/02 |

FOREIGN PATENT DOCUMENTS

| | | |
|---|---|---|
| CN | 103889054 A | 6/2014 |
| CN | 103997458 A | 8/2014 |
| JP | H0330546 A | 2/1991 |

OTHER PUBLICATIONS

Farrington, Nathan, et al., "Helios: A Hybrid Electrical/Optical Switch Architecture for Modular Data Centers," SIGCOMM'10, Aug. 30-Sep. 3, 2010, 12 pages.

Kalia, Anuj, et al., "Using RDMA Efficiently for Key-Value Services," SIGCOMM'14, Aug. 17-22, 2014, 15 pages.

Wang, Guohui, et al., "c-Through: Part-time Optics in Data Centers," SIGCOMM'10, Aug. 30-Sep. 3, 2010, 12 pages.

* cited by examiner

DATA TRANSMISSION METHOD AND APPARATUS IN OPTOELECTRONIC HYBRID NETWORK

CROSS-REFERENCE TO RELATED APPLICATIONS

This application is a continuation of International Application No. PCT/CN2015/079829, filed on May 26, 2015, the disclosure of which is hereby incorporated by reference in its entirety.

TECHNICAL FIELD

The present application relates to the computer field, and in particular, to a data transmission method and apparatus in an optoelectronic hybrid network.

BACKGROUND

A remote direct memory access (RDMA) technology is generated to eliminate a delay of data processing on a server end during network transmission. As shown in FIG. 1, in RDMA, a profile is directly transferred to a memory area of a computer by using a network, and data is quickly moved from a system to a remote system memory. This does not cause any impact to an operating system, and does not need much of a processing function of the computer.

Specifically, RDMA communication is implemented based on three types of queues: a send queue (SQ), a receive queue (RQ), and a completion queue (CQ). A work queue element (WQE) stored by the SQ indicates a storage location of data that needs to be sent. A WQE stored by the RQ indicates a storage location of received data. A completion queue element (CQE) stored by the CQ indicates a sending or receiving completion status. In addition, the SQ and the RQ are collectively referred to as a queue pair (QP), as shown in FIG. 2.

Therefore, because RDMA eliminates operations of external memory copying and text exchanging, a memory bandwidth and a central processing unit (CPU) period are released, and application system performance is improved.

Optical switching means directly switching an optical signal of an input end to any optical output end without performing any optical/electrical conversion. Optical switching is one key technology of an all-optical network. In a modern communications network, the all-optical network is a development trend of a future broadband communications network. The all-optical network can overcome a capacity bottleneck limit of electrical switching, greatly reduce networking costs, and improve network flexibility and reliability.

Although conventional RDMA is mainly used in electrical switching, optical-switching-based RDMA has attracted ever-increasing attention because of outstanding superiority of optical switching. Electrical-switching-based RDMA and optical-switching-based RDMA have their respective advantages and disadvantages. Optical switching has an advantage of high throughput, but has a relatively long switching time. The switching time is longer than 10 ms, and optical switching cannot well support burst traffic. The advantage of electrical switching is that electrical switching well supports burst traffic, and does not have a switching problem. The disadvantage of electrical switching is that electrical switching has a relatively low throughput and easily encounters a capacity bottleneck limit.

Therefore, an optoelectronic hybrid network is becoming increasingly popular currently in the industry, so as to fully use advantages of optical switching and electrical switching.

In an optoelectronic hybrid network in the prior art, a switch end performs prediction and analysis based on a traffic statistics result of network data packets, and selects an optical switching path or an electrical switching path according to an analysis result to send a subsequent data packet. However, this analysis is performed on the switch end. The switch end needs to perform traffic statistical analysis for a large quantity of network data packets, so as to allocate a sending path for a subsequent network data packet. Therefore, low system sending efficiency may be caused. In addition, selection of the sending path is determined by performing prediction for subsequent data packet traffic according to traffic statistical analysis of previous network data packets. Therefore, an inaccurate prediction case may occur, and this causes a path selection error and resource waste.

SUMMARY

Embodiments of the present disclosure provide a data transmission method and apparatus in an optoelectronic hybrid network. This can avoid a problem of inaccurate path selection and resource waste because traffic of a large quantity of network data packets is collected and analyzed.

According to a first aspect, a data transmission method in an optoelectronic hybrid network is provided. The data transmission method in an optoelectronic hybrid network includes:

receiving a remote direct memory access RDMA transmission request, and determining an RDMA transmission type and a to-be-transmitted data volume for data transmission according to the RDMA transmission request;

determining a preset encapsulation format corresponding to the RDMA transmission type for data transmission and the to-be-transmitted data volume for data transmission;

receiving to-be-transmitted data and encapsulating the to-be-transmitted data into a to-be-transmitted data packet of the determined preset encapsulation format;

selecting a switching link for data transmission from an optical switching link and an electrical switching link according to a size of the to-be-transmitted data packet; and sending the to-be-transmitted data packet to a peer end based on the selected switching link for data transmission.

With reference to the first aspect, in a first possible implementation manner, before the receiving an RDMA transmission request, the method further includes:

receiving an RDMA transmission establishment request message that is sent to the peer end, and determining an RDMA transmission type corresponding to the RDMA transmission establishment request message;

encapsulating the RDMA transmission establishment request message into a signaling data packet according to the RDMA transmission type corresponding to the RDMA transmission establishment request message; and selecting the electrical switching link to send the signaling data packet to the peer end.

With reference to the first aspect or the first possible implementation manner of the first aspect, in a second possible implementation manner, the determining an RDMA transmission type and a to-be-transmitted data volume for data transmission according to the RDMA transmission request includes:

determining the RDMA transmission type for data transmission according to an operation code in the RDMA transmission request; and determining the RDMA to-be-transmitted data volume for data transmission according to a to-be-transmitted data linked list and a data block quantity that are in the RDMA transmission request.

With reference to any one of the first aspect, or the first possible implementation manner to the second possible implementation manner of the first aspect, in a third possible implementation manner, the selecting a switching link for data transmission from an optical switching link and an electrical switching link according to a size of the to-be-transmitted data packet includes:

if the size of the to-be-transmitted data packet is less than a preset threshold, selecting the electrical switching link as the switching link for data transmission from the electrical switching link and the optical switching link; or if the size of the to-be-transmitted data packet is greater than or equal to a preset threshold, when the optical switching link is available, selecting the optical switching link as the switching link for data transmission from the electrical switching link and the optical switching link; or when the optical switching link is not available, selecting the switching link for data transmission from the electrical switching link and the optical switching link according to a transmission cost of the to-be-transmitted data packet.

With reference to the third possible implementation manner of the first aspect, in a fourth possible implementation manner, the selecting the switching link for data transmission from the electrical switching link and the optical switching link according to a transmission cost of the to-be-transmitted data packet includes:

calculating first duration required for sending the to-be-transmitted data packet by using the electrical switching link, and calculating second duration required for establishing a new optical switching link; and if the first duration is greater than or equal to the second duration, selecting the optical switching link as the switching link for data transmission from the electrical switching link and the optical switching link; or if the first duration is less than the second duration, selecting the electrical switching link as the switching link for data transmission from the electrical switching link and the optical switching link.

With reference to the first aspect, in a fifth possible implementation manner, the sending the to-be-transmitted data packet to a peer end based on the selected switching link for data transmission includes:

sending the to-be-transmitted data packet to the peer end through a port of an intelligent network interface card and based on the selected switching link for data transmission, where the port of the intelligent network interface card is separately corresponding to the optical switching link and the electrical switching link; or sending the to-be-transmitted data packet to a switch by using an intelligent network interface card, and sending the to-be-transmitted data packet to the peer end through a port of the switch and based on the selected switching link for data transmission, where the port of the switch is separately corresponding to the optical switching link and the electrical switching link.

With reference to the fifth possible implementation manner of the first aspect, in a sixth possible implementation manner, before the sending the to-be-transmitted data packet to a switch by using an intelligent network interface card, and sending the to-be-transmitted data packet to the peer end through a port of the switch and based on the selected switching link for data transmission, the method further includes:

adding a link tag to the to-be-transmitted data packet, where the link tag is used to instruct to use the electrical switching link for sending or to use the optical switching link for sending.

According to a second aspect, a data transmission apparatus in an optoelectronic hybrid network is provided. The data transmission apparatus in an optoelectronic hybrid network includes:

a receiving unit, configured to receive a remote direct memory access RDMA transmission request, and determine an RDMA transmission type and a to-be-transmitted data volume for data transmission according to the RDMA transmission request;

a determining unit, configured to determine a preset encapsulation format corresponding to the RDMA transmission type for data transmission and the to-be-transmitted data volume for data transmission;

an encapsulation unit, configured to receive to-be-transmitted data and encapsulate the to-be-transmitted data into a to-be-transmitted data packet of the determined preset encapsulation format;

a selection unit, configured to select a switching link for data transmission from an optical switching link and an electrical switching link according to a size of the to-be-transmitted data packet; and a sending unit, configured to send the to-be-transmitted data packet to a peer end based on the selected switching link for data transmission.

With reference to the second aspect, in a first possible implementation manner, before the RDMA transmission request is received, the receiving unit, configured to receive an RDMA transmission establishment request message that is sent to the peer end, and determine an RDMA transmission type corresponding to the RDMA transmission establishment request message;

the determining unit and the encapsulation unit, configured to encapsulate the RDMA transmission establishment request message into a signaling data packet according to the RDMA transmission type corresponding to the RDMA transmission establishment request message; and the selection unit and the sending unit, configured to select the electrical switching link to send the signaling data packet to the peer end.

With reference to the second aspect or the first possible implementation manner of the second aspect, in a second possible implementation manner, when determining the RDMA transmission type and the to-be-transmitted data volume for data transmission according to the RDMA transmission request, the receiving unit is configured to:

determine the RDMA transmission type for data transmission according to an operation code in the RDMA transmission request; and determine the RDMA to-be-transmitted data volume for data transmission according to a to-be-transmitted data linked list and a data block quantity that are in the RDMA transmission request.

With reference to any one of the second aspect, or the first possible implementation manner to the second possible implementation manner of the second aspect, in a third possible implementation manner, when selecting the switching link for data transmission from the optical switching link and the electrical switching link according to the size of the to-be-transmitted data packet, the selection unit is configured to:

if the size of the to-be-transmitted data packet is less than a preset threshold, select the electrical switching link as the switching link for data transmission from the electrical switching link and the optical switching link; or if the size of the to-be-transmitted data packet is greater than or equal to a preset threshold, when the optical switching link is available, select the optical switching link as the switching link for data transmission from the electrical switching link and the optical switching link; or when the optical switching link is not available, select the switching link for data transmission from the electrical switching link and the optical switching link according to a transmission cost of the to-be-transmitted data packet.

With reference to the third possible implementation manner of the second aspect, in a fourth possible implementation manner, when selecting the switching link for data transmission from the electrical switching link and the optical switching link according to the transmission cost of the to-be-transmitted data packet, the selection unit is configured to:

calculate first duration required for sending the to-be-transmitted data packet by using the electrical switching link, and calculate second duration required for establishing a new optical switching link; and if the first duration is greater than or equal to the second duration, select the optical switching link as the switching link for data transmission from the electrical switching link and the optical switching link; or if the first duration is less than the second duration, select the electrical switching link as the switching link for data transmission from the electrical switching link and the optical switching link.

With reference to the second aspect, in a fifth possible implementation manner, when sending the to-be-transmitted data packet to the peer end based on the selected switching link for data transmission, the sending unit is configured to:

send the to-be-transmitted data packet to the peer end through a port of an intelligent network interface card and based on the selected switching link for data transmission, where the port of the intelligent network interface card is separately corresponding to the optical switching link and the electrical switching link; or send the to-be-transmitted data packet to a switch by using an intelligent network interface card, and send the to-be-transmitted data packet to the peer end through a port of the switch and based on the selected switching link for data transmission, where the port of the switch is separately corresponding to the optical switching link and the electrical switching link.

With reference to the fifth possible implementation manner of the second aspect, in a sixth possible implementation manner, before sending the to-be-transmitted data packet to the switch by using the intelligent network interface card, and sending the to-be-transmitted data packet to the peer end through the port of the switch and based on the selected switching link for data transmission, the sending unit is further configured to:

add a link tag to the to-be-transmitted data packet, where the link tag is used to instruct to use the electrical switching link for sending or to use the optical switching link for sending.

The present disclosure brings the following beneficial effects:

In the embodiments of the present disclosure, a data transmission method in an optoelectronic hybrid network is provided, including: receiving an RDMA transmission request, and determining an RDMA transmission type and a to-be-transmitted data volume for data transmission according to the RDMA transmission request; determining a preset encapsulation format corresponding to the RDMA transmission type for data transmission and the to-be-transmitted data volume for data transmission; receiving to-be-transmitted data and encapsulating the to-be-transmitted data into a to-be-transmitted data packet of the determined preset encapsulation format; selecting a switching link for data transmission from an optical switching link and an electrical switching link according to a size of the to-be-transmitted data packet; and sending the to-be-transmitted data packet to a peer end based on the selected switching link for data transmission. Therefore, an intelligent network interface card on a host determines an RDMA transmission type and a to-be-transmitted data volume for data transmission by analyzing a received RDMA transmission request for data transmission; and determines a proper switching link for transmission according to a size of a corresponding data packet that is finally obtained by means of encapsulation. This avoids a problem of relatively low system sending efficiency and inaccurate traffic prediction of a subsequent data packet because a data packet is sent to a switch, and then a switching link is selected according to a traffic statistics result. Therefore, a proper switching link can be selected each time RDMA transmission for data transmission is performed. This avoids resource waste and makes full use of optoelectronic hybrid network resources.

DESCRIPTION OF EMBODIMENTS

To make the objectives, technical solutions, and advantages of the embodiments of the present disclosure clearer, the following clearly and describes the technical solutions in the embodiments of the present disclosure with reference to the accompanying drawings in the embodiments of the present disclosure. Apparently, the described embodiments are some but not all of the embodiments of the present disclosure. All other embodiments obtained by persons of ordinary skill in the art based on the embodiments of the present disclosure without creative efforts shall fall within the protection scope of the present disclosure.

To fully use an optoelectronic hybrid network to send data, embodiments of the present disclosure provide a data transmission method and apparatus in the optoelectronic hybrid network. The method is: receiving an RDMA transmission request, and determining an RDMA transmission type and a to-be-transmitted data volume for data transmission according to the RDMA transmission request; determining a preset encapsulation format corresponding to the RDMA transmission type for data transmission and the to-be-transmitted data volume for data transmission; receiving to-be-transmitted data and encapsulating the to-be-transmitted data into a to-be-transmitted data packet of the determined preset encapsulation format; selecting a switching link for data transmission from an optical switching link and an electrical switching link according to a size of the to-be-transmitted data packet; and sending the to-be-transmitted data packet to a peer end based on the selected switching link for data transmission.

Therefore, an intelligent network interface card on a host determines an RDMA transmission type and a to-be-transmitted data volume for data transmission by analyzing a received RDMA transmission request for data transmission; and determines a proper switching link for transmission according to a size of a corresponding data packet that is finally obtained by means of encapsulation. This avoids a problem of relatively low system sending efficiency and inaccurate traffic prediction of a subsequent data packet because a data packet is sent to a switch, and then a switching link is selected according to a traffic statistics result. Therefore, a proper switching link can be selected each time RDMA transmission for data transmission is performed. This avoids resource waste and makes full use of optoelectronic hybrid network resources.

In the following, the preferred implementation manners of the present disclosure are described in detail with reference to the accompanying drawings.

Figure 1:
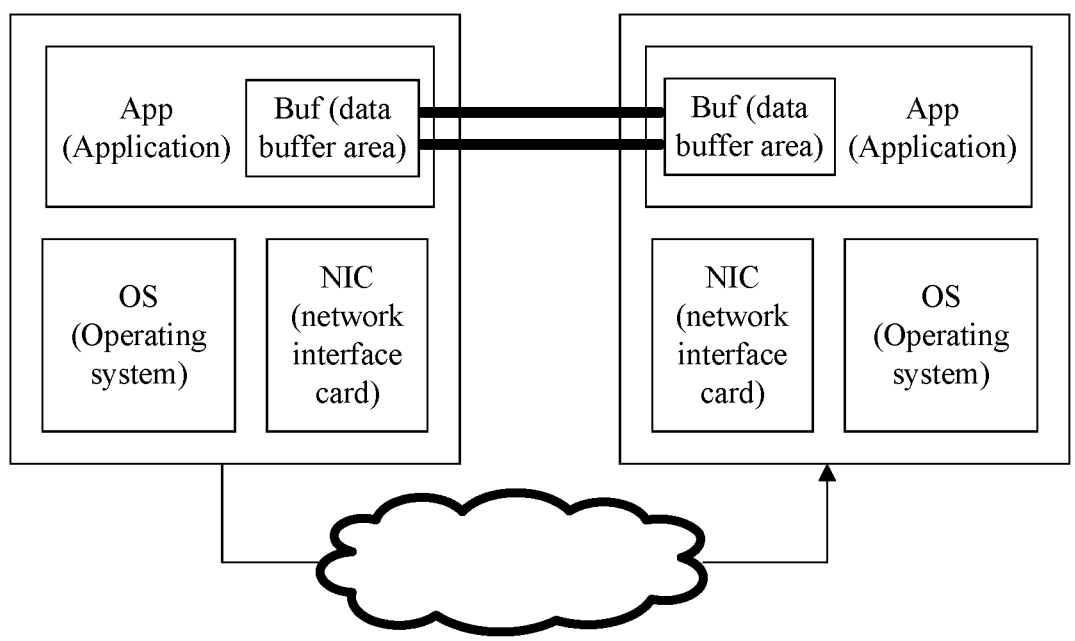
FIG. 1 is a schematic diagram of RDMA data transmission in the prior art.
Figure 2:
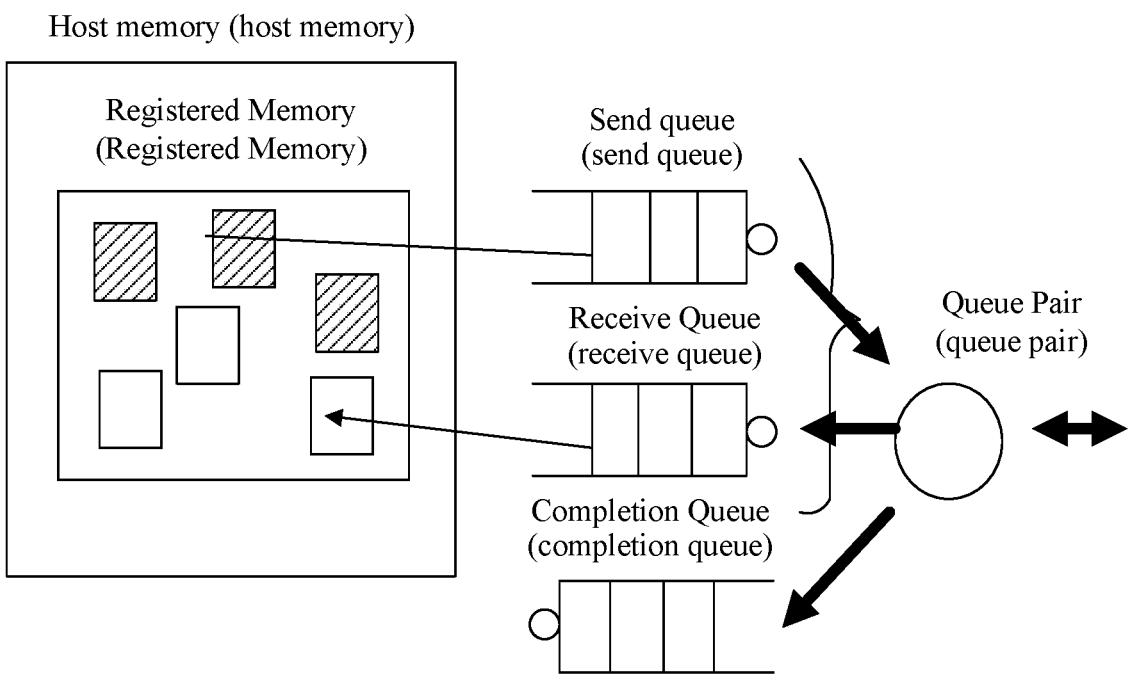
FIG. 2 is a schematic diagram of three RDMA work queues in the prior art.
Figure 3:
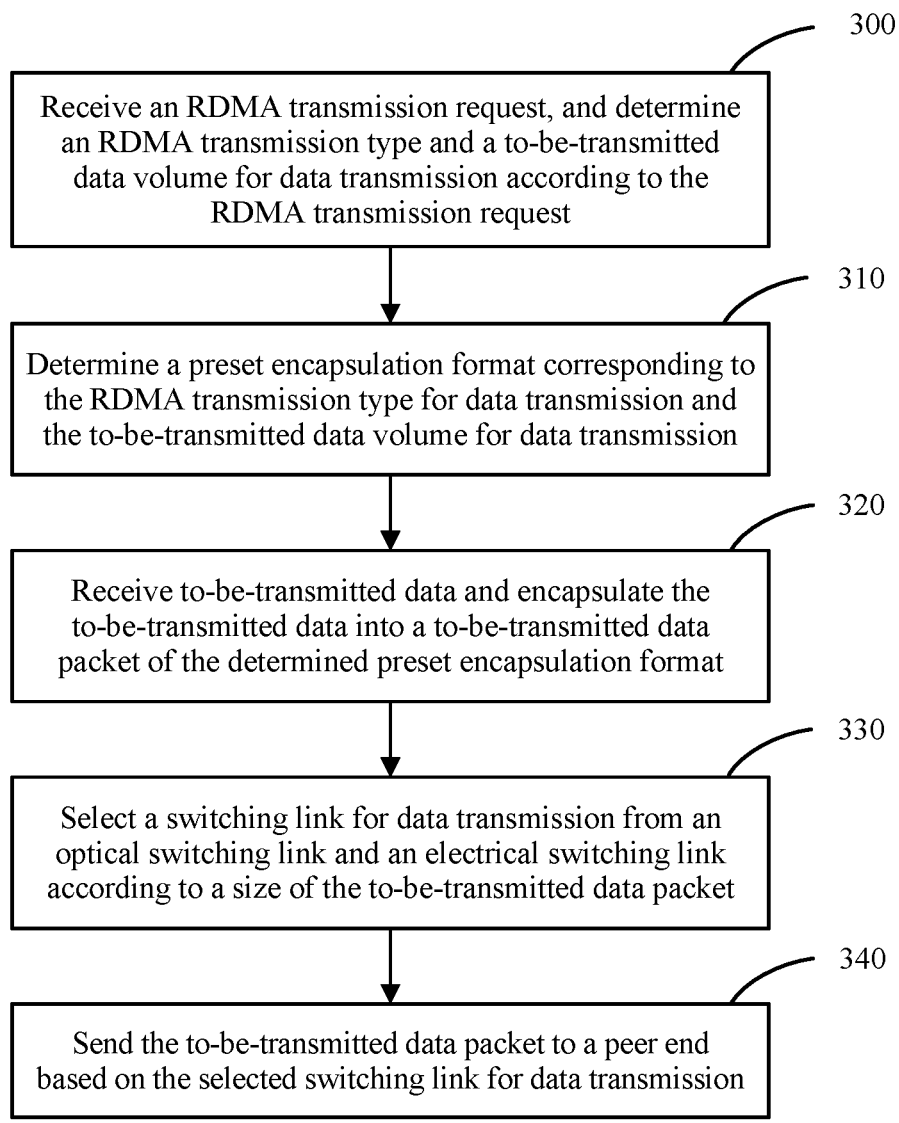
FIG. 3 is an overview flowchart of data transmission in an optoelectronic hybrid network according to an embodiment of the present disclosure.

Referring to FIG. 3, a specific process of data transmission in an optoelectronic hybrid network in the present disclosure is as follows:

Step 300: Receive an RDMA transmission request, and determine an RDMA transmission type and a to-be-transmitted data volume for data transmission according to the RDMA transmission request.

Specifically, when one application program at an application layer invokes, by using an RDMA interface, an intelligent network interface card to send or receive data, according to protocol stipulations, the application program sends an RDMA transmission request to the intelligent network interface card, and uses an operation code (opcode) to determine whether data transmission is a read or write process of a large-block data or sending of a single data packet.

In RDMA, a profile is directly transferred to a memory area of a computer by using a network, and data is quickly moved from a system to a remote system memory. This does not cause any impact to an operating system, and does not need much of a processing function of the computer. RDMA eliminates operations of external memory copying and protocol processing, and therefore, can make room for a bus and a CPU period to improve application system performance.

Specifically, when one application executes an RDMA read or write request, and no core memory is involved, the RDMA request is sent from an application that runs in user space to a local intelligent network interface card (NIC). The local intelligent NIC reads buffered content, and sends the buffered content to a target NIC by using a network. RDMA information transmitted on the network includes a destination virtual address, a memory key, and the data itself. Therefore, an RDMA operation enables an application to read data from a memory of a remote application or to write data to the memory. When receiving an RDMA message sent by the local NIC, the target NIC acknowledges the memory key, and finishes the RDMA read or write request for the data.

However, before the RDMA transmission request is received to transmit a large data block, that is, when an RDMA transmission establishment request message sent by a local application layer to a peer end is received for the first time, the intelligent network interface card determines an RDMA transmission type corresponding to the RDMA transmission establishment request message, encapsulates the RDMA transmission establishment request message into a corresponding signaling data packet according to the RDMA transmission type corresponding to the RDMA transmission establishment request message, where generally the transmission type is send, and preferably selects an electrical switching link to send the signaling data packet to the peer end. The signaling data packet includes an interface negotiation data packet (single data packet), and a data sending request data packet (single data packet).

The signaling data packet in this case is used to establish, with the peer end, necessary negotiation of RDMA transmission for subsequent data transmission, and determine authentication information such as an address and a memory key of RDMA transmission for subsequent data transmission. Therefore, the signaling data packet is basically a single data packet, and has a relatively small data volume. Preferably selecting the electrical switching link to send data can make good use of a characteristic that the electrical switching link supports burst traffic well and does not have a switching problem.

Generally, data of a sending party application is directly sent, by using a send message, to a buffer that a data receiving party application has not definitely claimed, and authentication information such as an address and a memory key of subsequent RDMA transmission is determined by performing necessary transmission negotiation.

For example, an application program of a host A needs to perform RDMA transmission with an application program of a host B. When the host A initiates RDMA transmission with the host B for the first time, the application program of the host A sends an RDMA transmission establishment request message to an intelligent network interface card of the host A, and determines an RDMA transmission type corresponding to the RDMA transmission establishment request message. The intelligent network interface card of the host A encapsulates the RDMA transmission establishment request message into a corresponding signaling data packet according to the RDMA transmission type corresponding to the RDMA transmission establishment request message, and preferably selects an electrical switching link to send the signaling data packet to the peer end. After RDMA transmission negotiation between the host A and the host B is successfully established, authentication information such as an address and a memory key of RDMA transmission for subsequent data transmission is determined.

Figure 4:
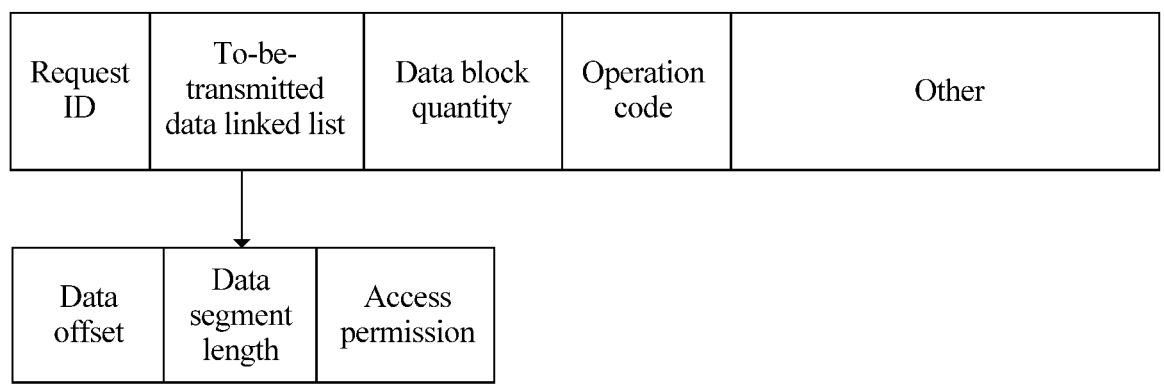
FIG. 4 is a schematic structural diagram of an RDMA transmission request according to an embodiment of the present disclosure.

Referring to FIG. 4, after an application program that locally initiates RDMA successfully negotiates with a peer end, in this case, the application program receives an RDMA transmission request for data transmission that is sent by an application program at a local application layer, determines an RDMA transmission type for data transmission according to an operation code in the RDMA transmission request, and determines an RDMA to-be-transmitted data volume for data transmission according to a to-be-transmitted data linked list and a data block quantity that are in the RDMA transmission request for data transmission.

As shown in FIG. 4, the RDMA request for data transmission includes a request ID, the to-be-transmitted data linked list, the data block quantity, an operation code, and other necessary information. The to-be-transmitted data linked list includes at least a data offset, a data segment length, and access permission.

Step 310: Determine a preset encapsulation format corresponding to the RDMA transmission type for data transmission and the to-be-transmitted data volume for data transmission.

The preset encapsulation format corresponding to the RDMA transmission type and the to-be-transmitted data volume for data transmission is determined according to protocol content of an RDMA protocol stack.

Currently, RDMA has two sorts of protocol suites: an infiniband (IB) and an Internet wide-area RDMA protocol (iWARP), but the two are similar to a large extent. Specifically, an RDMA protocol stack of the iWARP protocol suite is jointly implemented by three protocols: RDMA, a Direct Data Placement (DDP) protocol, and a marker protocol data unit aligned (MPA) set. This can ensure interoperability of a high-speed network. The RDMA layer is used to convert read, write, and send request messages of RDMA into an RDMA message. That is, first, the request messages are converted into the RDMA message according to an RDMA transmission type. The RDMA message is transferred to the DDP layer, and the DDP layer segmentally encapsulates the RDMA message into a DDP data packet and forwards the DDP data packet to the lower MPA layer. That is, the RDMA message generated by means of conversion according to an RDMA to-be-transmitted data volume is encapsulated into several data packets. The MPA layer inserts an identifier, a length, and a cyclic redundancy check (CRC) code to the DDP data packet, to compose an MPA data segment. A Transmission Control Protocol (TCP) layer is responsible for scheduling a TCP data segment to ensure that a sent packet can reach a target location smoothly. An Internet Protocol (IP) layer adds necessary network routing data information to the data packet. That is, network routing data information of the peer end is added.

Step 320: Receive to-be-transmitted data and encapsulate the to-be-transmitted data into a to-be-transmitted data packet of the determined preset encapsulation format.

The to-be-transmitted data is encapsulated into the to-be-transmitted data packet of the determined preset encapsulation format by using the determined preset encapsulation format.

Step 330: Select a switching link for data transmission from an optical switching link and an electrical switching link according to a size of the to-be-transmitted data packet.

Figure 5:
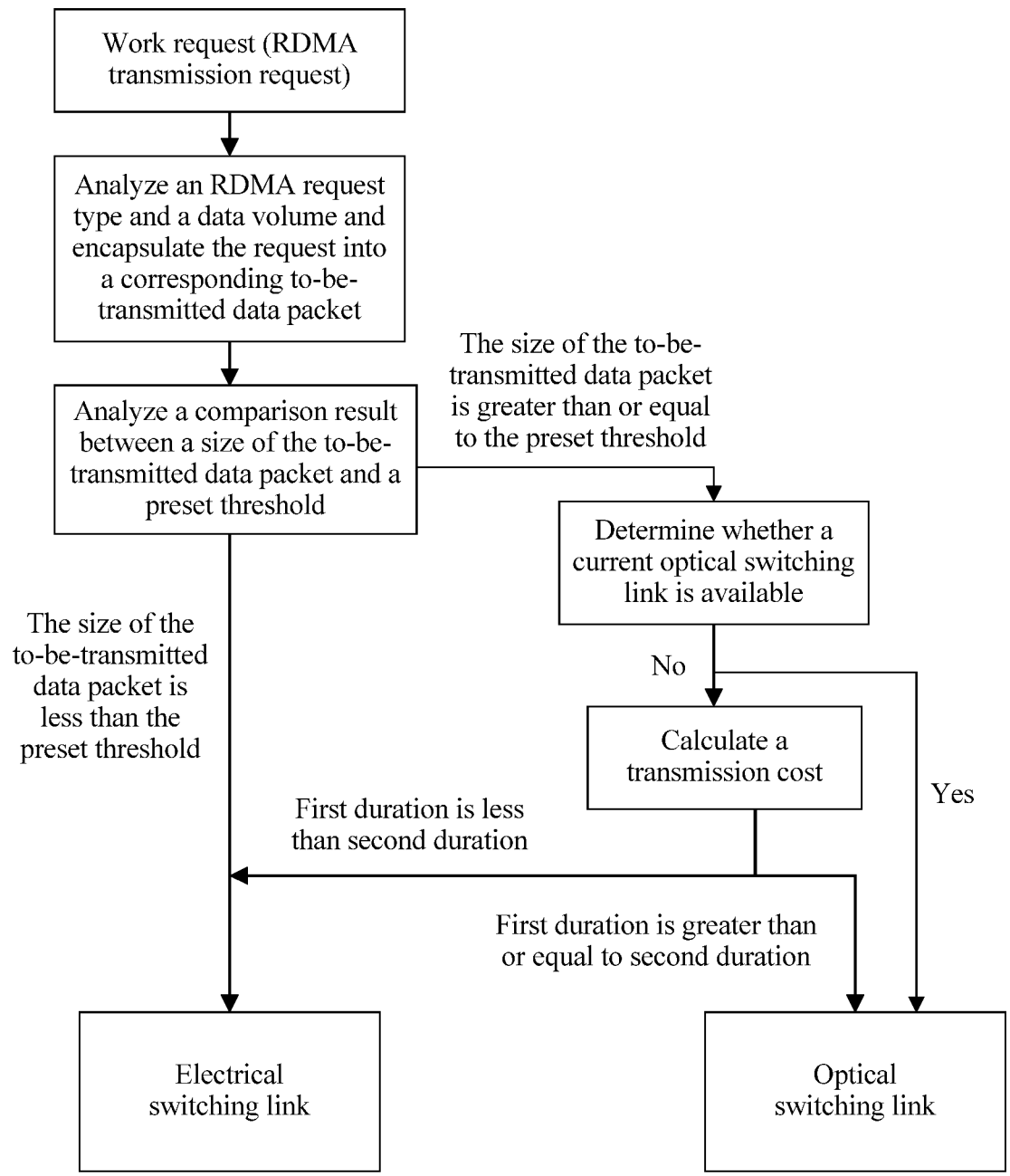
FIG. 5 is a schematic diagram of optoelectronic hybrid network selection according to an embodiment of the present disclosure.

Referring to FIG. 5, after the RDMA request type and the data volume for data transmission are analyzed and the corresponding to-be-transmitted data packet is obtained by means of encapsulation, specifically, first the size of the to-be-transmitted data packet is compared with a preset threshold.

If the size of the to-be-transmitted data packet is less than the preset threshold, the electrical switching link is selected as the switching link for data transmission from the electrical switching link and the optical switching link.

If the size of the to-be-transmitted data packet is greater than or equal to the preset threshold, when the optical switching link is available, the optical switching link is selected as the switching link for data transmission from the electrical switching link and the optical switching link; or when the optical switching link is not available, the switching link for data transmission is selected from the electrical switching link and the optical switching link according to a transmission cost of the to-be-transmitted data packet.

Further, when the optical switching link is not available, the switching link for data transmission is selected from the electrical switching link and the optical switching link according to the transmission cost of the to-be-transmitted data packet. A calculation method of the transmission cost is: calculating first duration required for sending the to-be-transmitted data packet by using the electrical switching link, and calculating second duration required for establishing a new optical switching link.

A specific process of selecting, according to the transmission cost of the to-be-transmitted data packet, the electrical switching link or the optical switching link to send the to-be-transmitted data packet to the peer end is:
    if the first duration is greater than or equal to the second duration, selecting the optical switching link as the switching link for data transmission from the electrical switching link and the optical switching link; or
    if the first duration is less than the second duration, selecting the electrical switching link as the switching link for data transmission from the electrical switching link and the optical switching link.

The smaller value of the first duration and the second duration is selected as the transmission cost of the to-be-transmitted data packet herein. Generally, a link switching time of a fixed path is a fixed value and is related to a physical property of a device. The second duration is a sum of a time of disconnecting a current optical switching link and a time of establishing a new optical switching link.

For example, when it is not the first time that the application program of the host A performs RDMA transmission with the host B, the intelligent network interface card of the host A determines an RDMA transmission type and a to-be-transmitted data volume for data transmission according to a received RDMA transmission request, determines a preset encapsulation format corresponding to the RDMA transmission type and the to-be-transmitted data volume for data transmission, receives to-be-transmitted data, and encapsulates the to-be-transmitted data into a to-be-transmitted data packet of the determined encapsulation format.

First, a size of the to-be-transmitted data packet of the host A is compared with a preset threshold. When the size of the to-be-transmitted data packet of the host A is greater than the preset threshold, whether a current optical switching link is available is further determined, that is, whether the current optical switching link is an optical switching link from the host A to the host B. If the current optical switching link is not available, a transmission cost of sending the to-be-transmitted data packet is further calculated. That is, the foregoing first duration and the second duration are calculated, and a link corresponding to the shorter duration is determined as a switching link for final data transmission.

Step 340: Send the to-be-transmitted data packet to a peer end based on the selected switching link for data transmission.

After the switching link for data transmission is selected from the electrical switching link and the optical switching link according to the size of the to-be-transmitted data packet, the to-be-transmitted data packet may be sent to the peer end in two manners based on the selected switching link for data transmission:

First, the to-be-transmitted data packet is sent to the peer end through a port of an intelligent network interface card, where the port of the intelligent network interface card is separately corresponding to the optical switching link and the electrical switching link.

Second, the to-be-transmitted data packet is sent to a switch by using an intelligent network interface card, and the to-be-transmitted data packet is sent to the peer end through a port of the switch and based on the selected switching link for data transmission, where the port of the switch is separately corresponding to the optical switching link and the electrical switching link.

In the second manner, before the to-be-transmitted data packet is sent to the switch by using the intelligent network interface card, and the to-be-transmitted data packet is sent to the peer end through the port of the switch and based on the selected switching link for data transmission, the intelligent network interface card adds a link tag to the to-be-transmitted data packet, where the link tag is used to instruct to use the electrical switching link for sending or to use the optical switching link for sending. For example, the tag herein may be a vlan tag.

For another example, the intelligent network interface card adds vlan100 to a data packet sent by using the optical switching link, and adds vlan200 to a data packet sent by using the electrical switching link. The intelligent network interface card transmits the data packet to the switch. After receiving the data packet from the intelligent network interface card, according to a tag of the data packet, the switch sends the data packet with vlan100 to an optical switching link interface, and sends the data packet with vlan200 to an electrical switching link interface.

Figure 6:
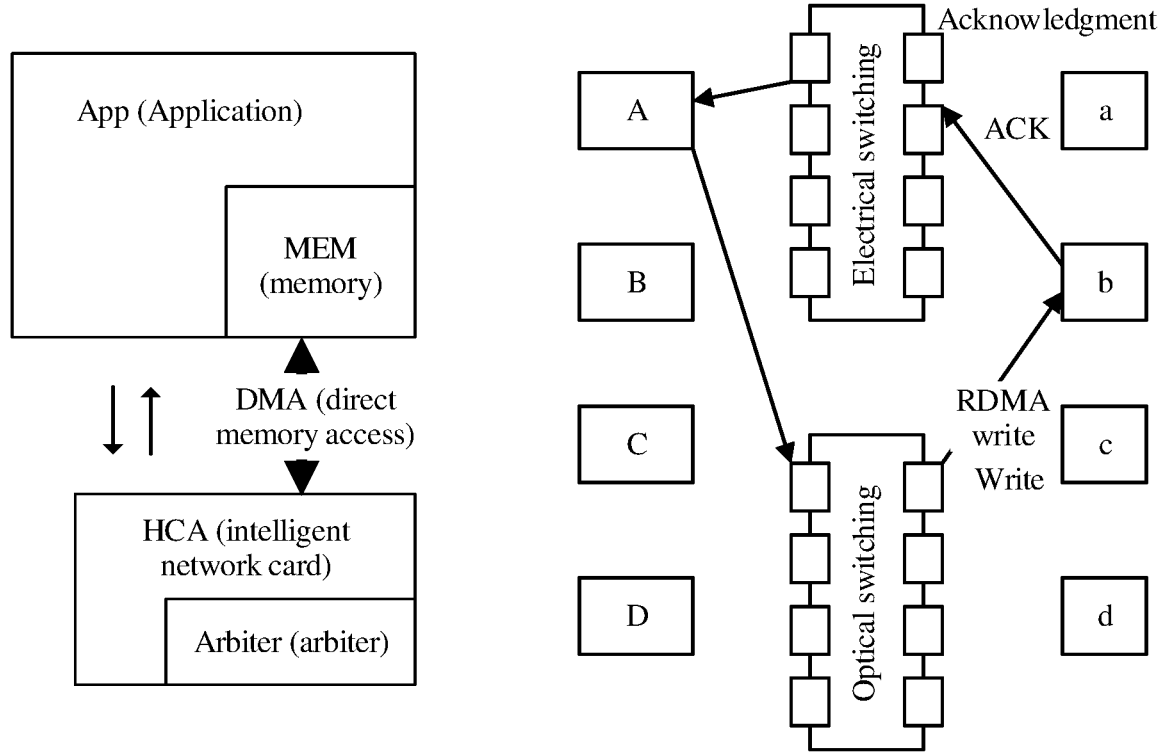
FIG. 6 is a schematic diagram of RDMA transmission between a host A and a host B according to an embodiment of the present disclosure.

In Embodiment 1, referring to FIG. 6, a local intelligent network interface card receives an RDMA transmission request for data transmission that is sent by an application X. The request type is write, and a to-be-transmitted data volume is a value E. The request is an RDMA transmission process from a host A to a host b. The host A and the host b have performed RDMA transmission. An arbiter module in the intelligent network interface card determines an RDMA transmission request type and a data volume for current data transmission, determines a preset encapsulation format corresponding to the RDMA transmission type and the to-be-transmitted data volume for data transmission, receives to-be-transmitted data, and encapsulates the to-be-transmitted data into a to-be-transmitted data packet of the determined encapsulation format. Further, when a size of the data packet is greater than a preset threshold 64 K, where the preset threshold is related to actual performance of a computer and a network, the arbiter module in the intelligent network interface card determines whether an optical switching link is available. If the optical switching link is not available, first duration required for sending the to-be-transmitted data packet by using an electrical switching link is calculated, that is, a data length is divided by a bandwidth; and second duration is calculated, for example, 200 ms. Then, the two types of duration are compared. If the first duration is greater than or equal to the second duration, the optical switching link is selected as a switching link for data transmission from the electrical switching link and the optical switching link; or if the first duration is less than the second duration, the electrical switching link is selected as the switching link for data transmission from the electrical switching link and the optical switching link.

After the transmission is finished, the host b feeds back an ACK to the host A. It is assumed herein that the second duration is less than the first duration, the optical switching link is used to send the to-be-transmitted data packet, and the host b feeds back the ACK to the host A by using the electrical switching link. The ACK is a signaling data packet.

Figure 7:
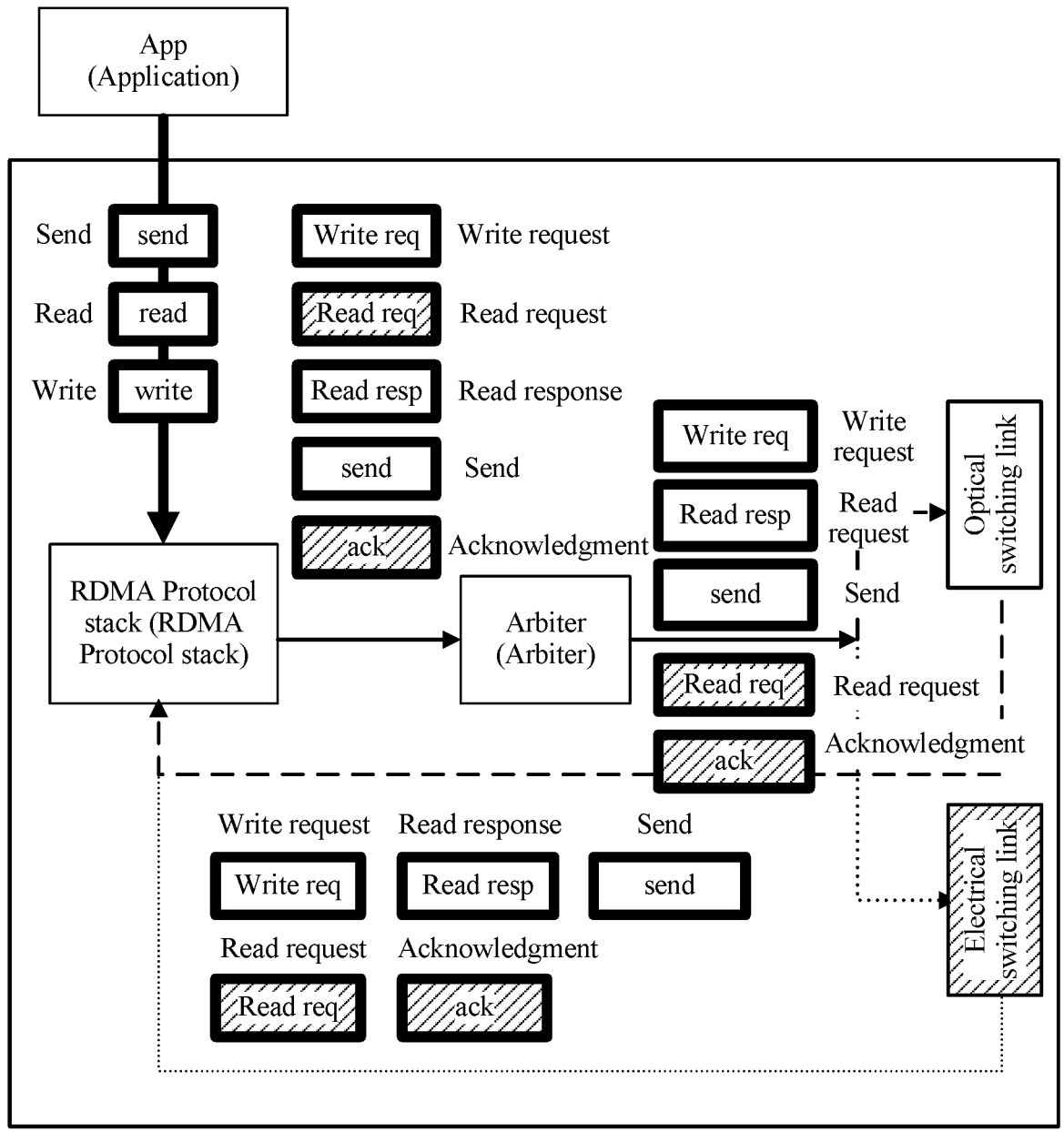
FIG. 7 is a schematic diagram of selecting sending paths by an intelligent network interface card according to different RDMA transmission requests according to an embodiment of the present disclosure.

Referring to FIG. 7, generally, an intelligent network interface card deals with different RDMA request types. Requests of read and write types are generally used for transmission of large data blocks. A request of a send type is used for signaling transmission of small data blocks. However, it should be noted herein that an electrical switching link is preferably selected to send the request of the send type, but this does not mean that the request of the send type can be sent merely by using the electrical switching link. If an optical switching link between two hosts is available in this case, the optical switching link may also be used for sending. Therefore, the intelligent network interface card allocates a proper switching link for each RDMA transmission request to perform transmission. This makes full use of optoelectronic hybrid network resources.

Figure 8:
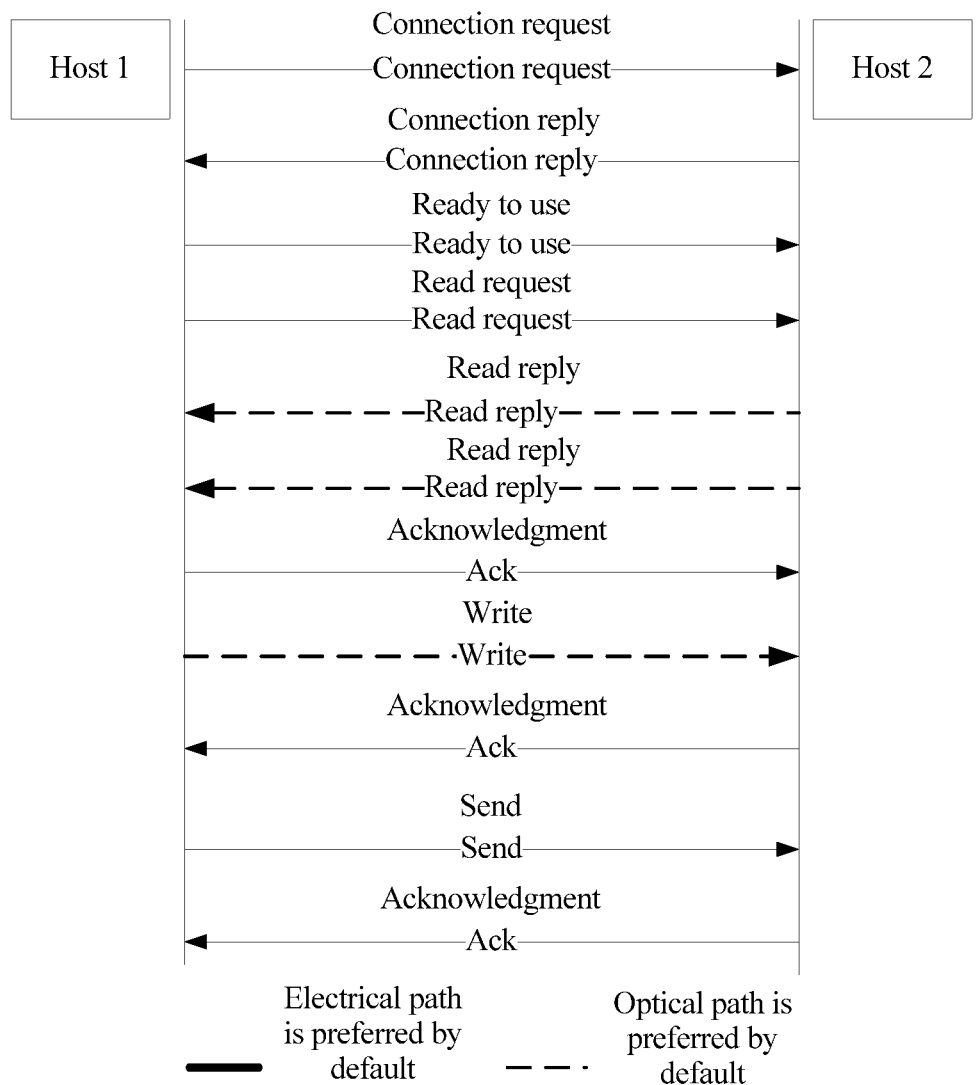
FIG. 8 is a schematic diagram of RDMA transmission between a host 1 and a host 2 according to an embodiment of the present disclosure.

In addition, the requests of the read and the write types are generally used for transmission of large data blocks, and the request of the send type is used for signaling transmission of small data blocks. Therefore, a switching link used by each transmission type may be preset. Referring to FIG. 8, for the requests of the read and the write types, the optical switching link is preferably used to perform transmission, and for the request of the send type, the electrical switching link is preferably used to perform transmission. A connection request is a specific application type of send. During connection establishment, a negotiation address is not used, and default configuration is first used. For example, in FIG. 8, for an RDMA request that is of the send type and initiated by a host 1 to a host 2, the electrical switching link is used to send a signaling data packet. All signaling data packets sent by using the electrical switching link are represented by solid lines. For RDMA requests of the read and the write types, the optical switching link is used to send a to-be-transmitted data packet. All to-be-transmitted data packets sent by using the optical switching link are represented by dashed lines.

Figure 9:
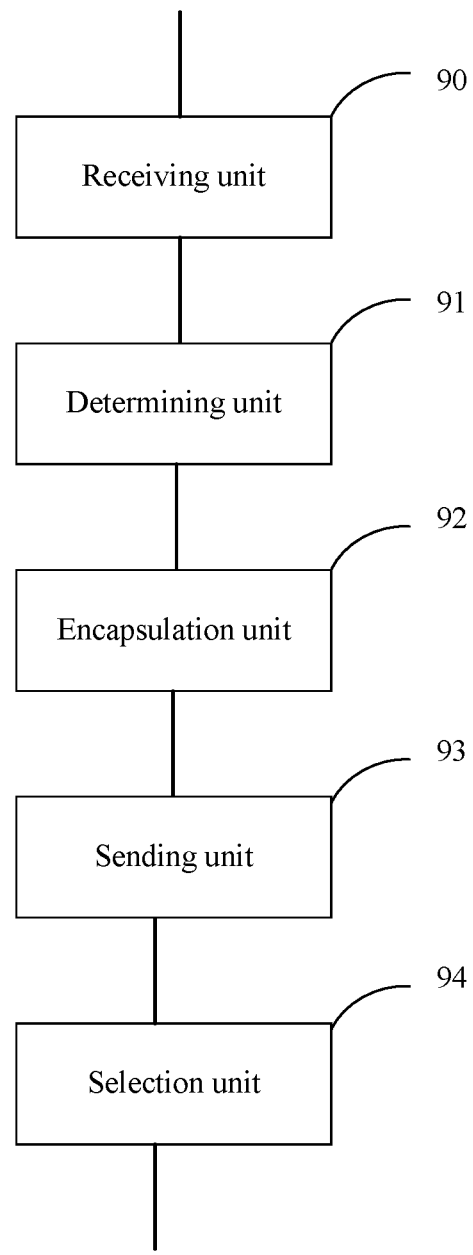
FIG. 9 is a schematic structural diagram of a data transmission apparatus in an optoelectronic hybrid network according to an embodiment of the present disclosure.

Referring to FIG. 9, a data transmission apparatus in an optoelectronic hybrid network is provided, including:

a receiving unit 90, configured to receive a remote direct memory access RDMA transmission request, and determine an RDMA transmission type and a to-be-transmitted data volume for data transmission according to the RDMA transmission request;

a determining unit 91, configured to determine a preset encapsulation format corresponding to the RDMA transmission type for data transmission and the to-be-transmitted data volume for data transmission;

an encapsulation unit 92, configured to receive to-be-transmitted data and encapsulate the to-be-transmitted data into a to-be-transmitted data packet of the determined preset encapsulation format;

a selection unit 93, configured to select a switching link for data transmission from an optical switching link and an electrical switching link according to a size of the to-be-transmitted data packet; and a sending unit 94, configured to send the to-be-transmitted data packet to a peer end based on the selected switching link for data transmission.

Optionally, before the RDMA transmission request is received, the receiving unit 90, configured to receive an RDMA transmission establishment request message that is sent to the peer end, and determine an RDMA transmission type corresponding to the RDMA transmission establishment request message;

the determining unit 91 and the encapsulation unit 92, configured to encapsulate the RDMA transmission establishment request message into a signaling data packet according to the RDMA transmission type corresponding to the RDMA transmission establishment request message; and the selection unit 93 and the sending unit 94, configured to select the electrical switching link to send the signaling data packet to the peer end.

Optionally, when determining the RDMA transmission type and the to-be-transmitted data volume for data transmission according to the RDMA transmission request, the receiving unit 90 is configured to:

determine the RDMA transmission type for data transmission according to an operation code in the RDMA transmission request; and determine the RDMA to-be-transmitted data volume for data transmission according to a to-be-transmitted data linked list and a data block quantity that are in the RDMA transmission request.

Optionally, when selecting the switching link for data transmission from the optical switching link and the electrical switching link according to the size of the to-be-transmitted data packet, the selection unit 93 is configured to:

if the size of the to-be-transmitted data packet is less than a preset threshold, select the electrical switching link as the switching link for data transmission from the electrical switching link and the optical switching link; or if the size of the to-be-transmitted data packet is greater than or equal to a preset threshold, when the optical switching link is available, select the optical switching link as the switching link for data transmission from the electrical switching link and the optical switching link; or when the optical switching link is not available, select the switching link for data transmission from the electrical switching link and the optical switching link according to a transmission cost of the to-be-transmitted data packet.

Optionally, when selecting the switching link for data transmission from the electrical switching link and the optical switching link according to the transmission cost of the to-be-transmitted data packet, the selection unit 93 is configured to:

calculate first duration required for sending the to-be-transmitted data packet by using the electrical switching link, and calculate second duration required for establishing a new optical switching link; and if the first duration is greater than or equal to the second duration, select the optical switching link as the switching link for data transmission from the electrical switching link and the optical switching link; or if the first duration is less than the second duration, select the electrical switching link as the switching link for data transmission from the electrical switching link and the optical switching link.

Optionally, when sending the to-be-transmitted data packet to the peer end based on the selected switching link for data transmission, the sending unit 94 is configured to:

send the to-be-transmitted data packet to the peer end through a port of an intelligent network interface card and based on the selected switching link for data transmission, where the port of the intelligent network interface card is separately corresponding to the optical switching link and the electrical switching link; or send the to-be-transmitted data packet to a switch by using an intelligent network interface card, and send the to-be-transmitted data packet to the peer end through a port of the switch and based on the selected switching link for data transmission, where the port of the switch is separately corresponding to the optical switching link and the electrical switching link.

Optionally, before sending the to-be-transmitted data packet to the switch by using the intelligent network interface card, and sending the to-be-transmitted data packet to the peer end through a port of the switch and based on the selected switching link for data transmission, the sending unit 94 is further configured to:

add a link tag to the to-be-transmitted data packet, where the link tag is used to instruct to use the electrical switching link for sending or to use the optical switching link for sending.

In conclusion, to fully use an optoelectronic hybrid network to send data, embodiments of the present disclosure provide a data transmission method and apparatus in the optoelectronic hybrid network. The method is: receiving an RDMA transmission request, and determining an RDMA transmission type and a to-be-transmitted data volume for data transmission according to the RDMA transmission request; determining a preset encapsulation format corresponding to the RDMA transmission type for data transmission and the to-be-transmitted data volume for data transmission; receiving to-be-transmitted data and encapsulating the to-be-transmitted data into a to-be-transmitted data packet of the determined preset encapsulation format; selecting a switching link for data transmission from an optical switching link and an electrical switching link according to a size of the to-be-transmitted data packet; and sending the to-be-transmitted data packet to a peer end based on the selected switching link for data transmission.

Therefore, an intelligent network interface card on a host determines an RDMA transmission type and a to-be-transmitted data volume for data transmission by analyzing a received RDMA transmission request for data transmission; and determines a proper switching link for transmission according to a size of a corresponding data packet that is finally obtained by means of encapsulation. This avoids a problem of relatively low system sending efficiency and inaccurate traffic prediction of a subsequent data packet because a data packet is sent to a switch, and then a switching link is selected according to a traffic statistics result. Therefore, a proper switching link can be selected each time RDMA transmission for data transmission is performed. This avoids resource waste and makes full use of optoelectronic hybrid network resources.

Persons skilled in the art should understand that the embodiments of the present disclosure may be provided as a method, a system, or a computer program product. Therefore, the present disclosure may use a form of hardware only embodiments, software only embodiments, or embodiments with a combination of software and hardware. Moreover, the present disclosure may use a form of a computer program product that is implemented on one or more computer-usable storage media (including but not limited to a disk memory, a CD-ROM, an optical memory, and the like) that include computer-usable program code.

The present disclosure is described with reference to the flowcharts and/or block diagrams of the method, the device (system), and the computer program product according to the embodiments of the present disclosure. It should be understood that computer program instructions may be used to implement each process and/or each block in the flowcharts and/or the block diagrams and a combination of a process and/or a block in the flowcharts and/or the block diagrams. These computer program instructions may be provided for a general-purpose computer, a dedicated computer, an embedded processor, or a processor of any other programmable data processing device to generate a machine, so that the instructions executed by a computer or a processor of any other programmable data processing device generate an apparatus for implementing a specific function in one or more processes in the flowcharts and/or in one or more blocks in the block diagrams.

These computer program instructions may be stored in a computer readable memory that can instruct the computer or any other programmable data processing device to work in a specific manner, so that the instructions stored in the computer readable memory generate an artifact that includes an instruction apparatus. The instruction apparatus implements a specific function in one or more processes in the flowcharts and/or in one or more blocks in the block diagrams.

These computer program instructions may be loaded onto a computer or another programmable data processing device, so that a series of operations and steps are performed on the computer or the another programmable device, thereby generating computer-implemented processing. Therefore, the instructions executed on the computer or the other programmable device provide steps for implementing a specific function in one or more processes in the flowcharts and/or in one or more blocks in the block diagrams.

Although some preferred embodiments of the present disclosure have been described, persons skilled in the art can make changes and modifications to these embodiments once they learn the basic inventive concept. Therefore, the following claims are intended to be construed as to cover the preferred embodiments and all changes and modifications falling within the scope of the present disclosure.

Obviously, persons skilled in the art can make various modifications and variations to the embodiments of the present disclosure without departing from the spirit and scope of the embodiments of the present disclosure. The present disclosure is intended to cover these modifications and variations provided that they fall within the scope of protection defined by the following claims and their equivalent technologies.

What is claimed is:

1. A data transmission method in an optoelectronic hybrid network, the method comprising:
   receiving a remote direct memory access (RDMA) transmission request, and determining an RDMA transmission type and a to-be-transmitted data volume for data transmission according to the RDMA transmission request;
   determining a preset encapsulation format corresponding to the RDMA transmission type for data transmission and the to-be-transmitted data volume for data transmission;
   receiving to-be-transmitted data and encapsulating the to-be-transmitted data into a to-be-transmitted data packet of the determined preset encapsulation format;
   selecting a switching link for data transmission from an optical switching link and an electrical switching link according to a size of the to-be-transmitted data packet, including:
      selecting the optical switching link from the electrical switching link and the optical switching link as the switching link for the RDMA data transmission in response to the determining the size of the to-be-transmitted data packet is greater than or equal to a preset threshold, and the optical switching link is available; and
   sending the to-be-transmitted data packet to a peer end based on the selected switching link for data transmission.

2. The method according to claim 1, wherein before receiving an RDMA transmission request, the method further comprises:
   receiving an RDMA transmission establishment request message that is sent to the peer end, and determining an RDMA transmission type corresponding to the RDMA transmission establishment request message;
   encapsulating the RDMA transmission establishment request message into a signaling data packet according to the RDMA transmission type corresponding to the RDMA transmission establishment request message; and
   selecting the electrical switching link to send the signaling data packet to the peer end.

3. The method according to claim 1, wherein determining an RDMA transmission type and a to-be-transmitted data volume for data transmission according to the RDMA transmission request comprises:
   determining the RDMA transmission type for data transmission according to an operation code in the RDMA transmission request; and
   determining the to-be-transmitted data volume for data transmission according to a to-be-transmitted data linked list and a data block quantity that are in the RDMA transmission request.

4. The method according to claim 1, wherein selecting a switching link for data transmission from an optical switching link and an electrical switching link according to a size of the to-be-transmitted data packet comprises:
   selecting the electrical switching link as the switching link for data transmission from the electrical switching link and the optical switching link when the size of the to-be-transmitted data packet is less than a preset threshold.

5. The method according to claim 1, wherein selecting a switching link for data transmission from an optical switching link and an electrical switching link according to a size of the to-be-transmitted data packet comprises:
   selecting the switching link for data transmission from the electrical switching link and the optical switching link according to a transmission cost of the to-be-transmitted data packet when the size of the to-be-transmitted data packet is greater than or equal to a preset threshold, and the optical switching link is not available.

6. The method according to claim 5, wherein selecting the switching link for data transmission from the electrical switching link and the optical switching link according to a transmission cost of the to-be-transmitted data packet comprises:

calculating a first duration required for sending the to-be-transmitted data packet by using the electrical switching link, and calculating a second duration required for establishing a new optical switching link; and selecting the optical switching link as the switching link for data transmission from the electrical switching link and the optical switching link when the first duration is greater than or equal to the second duration.

7. The method according to claim 5, wherein selecting the switching link for data transmission from the electrical switching link and the optical switching link according to a transmission cost of the to-be-transmitted data packet comprises:

selecting the electrical switching link as the switching link for data transmission from the electrical switching link and the optical switching link when the first duration is less than the second duration.

8. The method according to claim 1, wherein sending the to-be-transmitted data packet to a peer end based on the selected switching link for data transmission comprises:

sending the to-be-transmitted data packet to the peer end through a port of an intelligent network interface card and based on the selected switching link for data transmission, wherein the port of the intelligent network interface card is separately corresponding to the optical switching link and the electrical switching link.

9. The method according to claim 1, wherein sending the to-be-transmitted data packet to a peer end based on the selected switching link for data transmission comprises:

sending the to-be-transmitted data packet to a switch by using an intelligent network interface card, and sending the to-be-transmitted data packet to the peer end through a port of the switch and based on the selected switching link for data transmission, wherein the port of the switch is separately corresponding to the optical switching link and the electrical switching link.

10. The method according to claim 9, wherein before sending the to-be-transmitted data packet to a switch by using an intelligent network interface card, and sending the to-be-transmitted data packet to the peer end through a port of the switch and based on the selected switching link for data transmission, the method further comprises:

adding a link tag to the to-be-transmitted data packet, wherein the link tag is used to instruct to use the electrical switching link for sending or to use the optical switching link for sending.

11. A data transmission apparatus in an optoelectronic hybrid network, the apparatus comprising:

a buffer; and a processor coupled to the buffer and configured to:

receive a remote direct memory access (RDMA) transmission request, and determine an RDMA transmission type and a to-be-transmitted data volume for data transmission according to the RDMA transmission request, determine a preset encapsulation format corresponding to the RDMA transmission type for data transmission and the to-be-transmitted data volume for data transmission, receive to-be-transmitted data and encapsulate the to-be-transmitted data into a to-be-transmitted data packet of the determined preset encapsulation format, select a switching link for data transmission from an optical switching link and an electrical switching link according to a size of the to-be-transmitted data packet, wherein the processor is further configured to;

select the optical switching link from the electrical switching link and the optical switching link as the switching link for the RDMA data transmission in response to the determining the size of the to-be-transmitted data packet is greater than or equal to a preset threshold, and the optical switching link is available, and send the to-be-transmitted data packet to a peer end based on the selected switching link for data transmission.

12. The apparatus according to claim 11, wherein the processor is further configured to:

receive an RDMA transmission establishment request message that is sent to the peer end, and determine an RDMA transmission type corresponding to the RDMA transmission establishment request message;

encapsulate the RDMA transmission establishment request message into a signaling data packet according to the RDMA transmission type corresponding to the RDMA transmission establishment request message; and select the electrical switching link to send the signaling data packet to the peer end.

13. The apparatus according to claim 11, wherein the processor is further configured to:

determine the RDMA transmission type for data transmission according to an operation code in the RDMA transmission request; and determine the to-be-transmitted data volume for data transmission according to a to-be-transmitted data linked list and a data block quantity that are in the RDMA transmission request.

14. The apparatus according to claim 11, wherein the processor is further configured to:

select the electrical switching link as the switching link for data transmission from the electrical switching link and the optical switching link when the size of the to-be-transmitted data packet is less than a preset threshold.

15. The apparatus according to claim 11, wherein the processor is further configured to:

select the switching link for data transmission from the electrical switching link and the optical switching link according to a transmission cost of the to-be-transmitted data packet when the size of the to-be-transmitted data packet is greater than or equal to a preset threshold, and the optical switching link is not available.

16. The apparatus according to claim 15, wherein the processor is further configured to:

calculate a first duration required for sending the to-be-transmitted data packet by using the electrical switching link, and calculate a second duration required for establishing a new optical switching link; and select the optical switching link as the switching link for data transmission from the electrical switching link and the optical switching link when the first duration is greater than or equal to the second duration.

17. The apparatus according to claim 15, wherein the processor is further configured to:

select the electrical switching link as the switching link for data transmission from the electrical switching link and the optical switching link when the first duration is less than the second duration.

18. The apparatus according to claim 11, wherein the processor is further configured to:
send the to-be-transmitted data packet to the peer end through a port of an intelligent network interface card and based on the selected switching link for data transmission, wherein the port of the intelligent network interface card is separately corresponding to the optical switching link and the electrical switching link.

* * * * *

UNITED STATES PATENT AND TRADEMARK OFFICE
CERTIFICATE OF CORRECTION

PATENT NO. : 10,868,767 B2
APPLICATION NO. : 15/821620
DATED : December 15, 2020
INVENTOR(S) : Weifeng Shen, Xiuchu Zhao and Fengwei Zhang It is certified that error appears in the above-identified patent and that said Letters Patent is hereby corrected as shown below:

In the Claims

In Claim 1, Column 16, Line 14, delete "link for the RDMA" and insert --link for RDMA--.

In Claim 11, Column 18, Line 8, delete "link for the RDMA" and insert --link for RDMA--.

Signed and Sealed this
Thirtieth Day of March, 2021

Drew Hirshfeld
*Performing the Functions and Duties of the*
*Under Secretary of Commerce for Intellectual Property and*
*Director of the United States Patent and Trademark Office*